Nov. 13, 1934.  K. J. MONRAD  1,980,628
MILK DESSERT
Filed March 23, 1931
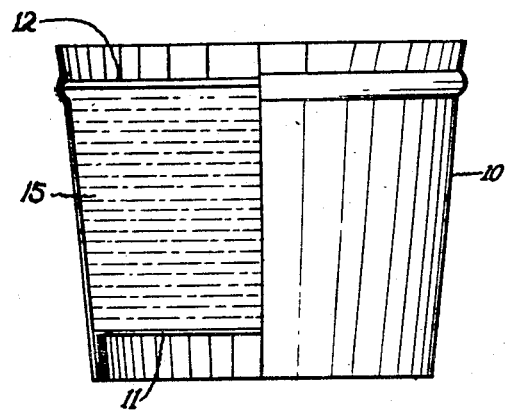
Inventor
KARL J. MONRAD
By H H Snelling
Attorney Patented Nov. 13, 1934

1,980,628

UNITED STATES PATENT OFFICE 1,980,628

MILK DESSERT

Karl J. Monrad, Little Falls, N. Y.

Application March 23, 1931, Serial No. 524,705

7 Claims. (Cl. 99—11)

This invention relates to milk desserts and has for its object the provision of a method whereby it is possible to form the dessert in a factory or a milk plant and ship it to the place of use.

A further object of the invention consists in the packaging of the dessert in such a fashion that it will keep for a sufficient length of time so that it can be delivered in attractive appearance to the home or hospital.

A still further object of the invention consists in the method of making the milk dessert more stable in form by adding to the milk a colloidal agent to stiffen the body of the dessert.

Altho milk desserts made by treating fresh milk with rennin are old and immensely popular, not only for invalids and young people but for those in perfect health, up to the present time it has been considered to be quite out of the question to make this form of dessert in a factory or a milk plant because in preparing the dessert in the ordinary glass dish or waterpoof vessel the whey settles out after a reasonably short period of time and detracts very materially from the appearance of the dessert altho not detracting in any way from its palatability. Consequently to avoid the wheying off it has been the invariable custom to consume the dessert within a short time after it has been made and conversely never to make the dessert at a distant point.

The present invention contemplates the manufacture of the dessert at the creamery and this remarkably new result is obtained by the manufacture of the dessert at the milk plant or factory and the packaging of the dessert in a paper cup in which the inside wall of the container is somewhat absorbent.

The figure shows a chosen embodiment of the invention.

There are on the market at the present time certain preparations suited to the making of this form of dessert, these materials having for their active element a rennin enzyme which curdles the milk in well known manner. While such rennet tablets, powders, and liquid preparations are satisfactory for curdling the milk, I find that I can improve the prepared milk dessert quite materially for commercial sale by adding a sufficient portion of some colloidal element such as gum tragacanth, gum arabic, indian gum, agar, or preferably gelatin with the idea of stiffening the dessert. With gelatin, for example, one part to sixty-four parts of milk may be used in addition to the rennin and by the addition of this colloid the milk dessert is especially firm and if desired the dessert may be turned out of the container into a dish and still hold its form. It is especially to be remembered, however, that it is not the idea of this invention to form the dessert so that it can be turned out of the container as a particular feature of the invention concerns the prevention of the separation of the whey in visible amount and naturally if the dessert is turned out of the container into a dish it will whey some in the dish. The addition of the gelatin, however, while not at all essential, is quite desirable, in that in this way a rennin dessert can be sold commercially by the different milk plants even more safely than by the use of the paper cup alone and can be delivered from their wagons and even could be sold by the retail stores.

The paper container is of the well known type shown in the drawing, consisting of an outer conical wall 10 in which is inserted rather permanently a bottom 11 and having a readily removable top 12 fitting in a groove near the upper margin of the cup. The top, while highly desirable, is not essential but improves the looks of the device and protects the content from dust. The numeral 15 represents the milk dessert prepared by the use of rennin and preferably containing gelatin or other colloid. When the dessert is placed in this cup, the inside of which is somewhat absorbent, the paper in the cup will absorb the slight amount of whey that is formed between the time of manufacture and consumption. I also find that an unexpected advantage is had in that a slight jarring will not cause the rennet dessert to slide out of the cup as the milk dessert will stick to the unglazed paper while, when using glass or porcelain, the dessert will slip from the cup most readily and unexpectedly.

What I claim is:

1. The method of packaging a curdled milk dessert so that it can be delivered from the place of making to a distant point which consists in placing the dessert in a paper receptacle of such absorbent qualities as to take up the slight amount of whey formed while the dessert is being transported, so as to avoid the presence of the whey when delivered or consumed.

2. The method of making a packaged dessert which consists in treating sweet milk with an enzyme, adding gelatin in the proportion of one part to sixty-four or more parts milk, immediately filling a slightly absorbent container with said treated milk and allowing same to curdle in the container.

3. The method of making a packaged dessert which consists in treating whole sweet milk with an enzyme, at the same time adding a colloid to the treated milk, filling a slightly absorbent paper cup with the resulting liquid and allowing same to curdle in the cup.

4. The method of making a milk dessert in a creamery so that it can be delivered to a home or a hospital in attractive appearance which consists in treating fresh sweet milk with a curdling agent such as rennin, and in pouring the milk into small individual containers of unglazed paper of such absorbent qualities as to take up the whey formed by the dessert during the time it takes to deliver the dessert whereby the whey which is formed shall be invisible to the consumer and the dessert therefore presented in attractive manner.

5. An article of sale comprising a dessert consisting of coagulated milk of custard-like consistency packaged in a paper receptacle of such absorbent qualities as to take up the slight amount of whey formed when the dessert stands.

6. A package consisting of a paper receptacle having slowly absorbent qualities containing a dessert consisting of rennin treated coagulated milk of custard-like consistency, said dessert containing a colloid to reduce the wheying and to increase the stiffness, whereby said package may undergo relatively rough handling without changing the unbroken custard-like consistency.

7. A dessert package comprising a paper cup containing an unbroken custard, said custard consisting of milk mixed with sufficient rennin to coagulate the same and having one part of gelatin to sixty-four or more parts of milk, and the consistency of the paper cup being such that it will absorb the whey formed by the dessert in twelve hours.

KARL J. MONRAD.